United States Patent
Gopinath et al.

(10) Patent No.: US 9,038,102 B1
(45) Date of Patent: May 19, 2015

(54) CABLE TELEVISION SYSTEM WITH INTEGRATED SOCIAL STREAMING

(71) Applicant: Cox Communications, Inc., Atlanta, GA (US)

(72) Inventors: Radhakrishnan Gopinath, Alpharetta, GA (US); Lalit T. Bhatia, Alparetta, GA (US); Pujan Roka, Atlanta, GA (US); Catalina Gard, Roswell, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/759,143

(22) Filed: Feb. 5, 2013

(51) Int. Cl.
| | |
|---|---|
| H04N 5/445 | (2011.01) |
| G06F 3/00 | (2006.01) |
| G06F 13/00 | (2006.01) |
| H04N 21/4788 | (2011.01) |
| H04N 7/14 | (2006.01) |
| H04N 21/2668 | (2011.01) |

(52) U.S. Cl.
CPC ............ H04N 21/4788 (2013.01); H04N 7/141 (2013.01); H04N 21/2668 (2013.01)

(58) Field of Classification Search
CPC ........................ H04N 21/4788; H04N 21/2668
USPC .............................................. 725/11, 12, 38, 61
See application file for complete search history.

(56) References Cited

U.S. PATENT DOCUMENTS

| | | | |
|---|---|---|---|
| 2006/0271997 A1* | 11/2006 | Jacoby et al. ................. | 725/135 |
| 2008/0022307 A1* | 1/2008 | Jeong et al. .................... | 725/44 |
| 2008/0310683 A1* | 12/2008 | Robinson et al. ............. | 382/107 |
| 2009/0222875 A1* | 9/2009 | Cheng et al. ................... | 725/147 |
| 2011/0107382 A1* | 5/2011 | Morris et al. ................. | 725/109 |
| 2012/0110621 A1* | 5/2012 | Gossweiler, III .............. | 725/46 |
| 2012/0174157 A1* | 7/2012 | Stinson et al. ................. | 725/40 |
| 2012/0268591 A1* | 10/2012 | Kimura .......................... | 348/143 |
| 2014/0026157 A1* | 1/2014 | Wang et al. .................... | 725/12 |
| 2014/0053190 A1* | 2/2014 | Sirpal ............................. | 725/37 |

* cited by examiner

Primary Examiner — Ricky Chin
(74) Attorney, Agent, or Firm — Merchant & Gould (57) ABSTRACT

A cable television system with integrated social streaming. The cable television system with integrated social streaming includes a set-top box in communication with a camera and/or a microphone that allows video and/or audio communication over a social streaming channel offered by the cable provider. The cable television system with integrated social streaming provides an interactive experience for a set-top box user by allowing the user to participate in video and/or audio conversations with friends on supported social streaming services.

20 Claims, 6 Drawing Sheets

CABLE TELEVISION SYSTEM WITH INTEGRATED SOCIAL STREAMING

BACKGROUND

Over the air and cable television generally offers a linear experience where the viewer can only watch content offered by the cable provider. The experience provided by over the air and cable television is also typically limited to an individual or a local small group (e.g., family and friends) experience. Communicating with remote family and friends is generally accomplished using systems capable of transmitting textual messages, voice and/or images (e.g., instant messaging, texting, phone calls, or email) with limitations on bandwidth, small screen sizes, internet connection requirements, expensive data plans, or social networks not integrated with the television viewing experience. With currently existing communication systems, none provide an integrated user experience integrating the conversation participants with the television viewing experience. It is with respect to these and other considerations that the present invention has been made.

BRIEF SUMMARY

Embodiments of the present invention may provide for a cable system with integrated social streaming that include a set-top box in communication with a camera and/or a microphone that allows video and/or audio communication over a social streaming channel offered by the cable provider. The cable system with integrated social streaming provides an interactive experience for a set-top box user by allowing the user to participate in video and/or audio conversations with friends on supported social streaming services.

Various embodiments of the cable system with integrated social streaming include a set-top box, a television display, a speaker, a camera, and a microphone at the physical location associated with a cable system subscriber account. The subscriber creates one or more user profiles corresponding to individuals associated with the subscriber account. The set-top box is connected to the cable system network and serves as the client that allows the set-top box user to participate in conversations with friends on supported social streaming services. The cable system network is connected to the internet, allowing the set-top box user to communicate with friends on various supported social streaming services. Friends are not limited to using the set-top box as a client and may participate in the conversation using any number of various hardware devices as clients including, but not limited to, phones, camera phones, and computers.

Various embodiments of the cable system with integrated social streaming include a social streaming application provided by the programming guide of the set-top box. Various embodiments utilize cable card or other alternative technologies in place of a set-top box. In some embodiments, the social streaming application is installed on a smart television. The social streaming application includes a local display component, a television channel selection component, a social network interface component, at least one live social streaming component, and a profile management component. In the illustrated embodiment, the social streaming front end also includes optional components such a logo and/or advertising component and an options and settings component. The back end of the social streaming application handles connections to supported social streaming services, captures local audio and video using the camera and microphone, encodes and addresses the captured audio and video, streams the encoded audio and video, determines if incoming audio and video is addressed to the active user profile, decodes incoming audio and video addressed to the active user profile, and sends the decoded audio and video to front end for output.

Initially, the set-top box user logs in to the programming guide on the set-top box using a user profile associated with a subscriber account. The user profile uniquely identifies the set-top box user and allows the retrieval of customized settings such as favorite channels and, in this case, social streaming service login information. The local display component shows the video captured by the attached camera and allows the set-top box user to monitor what friends are seeing. The television channel selection component provides a list of channels offered by the provider of the cable system. The cable system includes at least one channel dedicated to social streaming.

The social network interface component allows the currently active user profile to be associated with any supported social streaming service(s) and provides information about and/or from any social streaming services associated with the currently active user profile. Once the currently active user profile is connected to a social streaming service, the social network interface component displays a list of the user's friends from the connected social streaming service. The user names of friends and other information about the social streaming service or the friends is retrieved from each social streaming service. The friend list also shows a status indicator next to each friend name to indicate the friend's status. In some embodiments, the social streaming application uses image recognition to automate setting the active set-top box user profile and/or the status of the active set-top box user.

When user selects the option to add or log in to a social streaming service, the social network interface component displays a list of supported social streaming services. Once the user selects a social streaming service, the social network interface component displays fields used to log in to the selected social streaming service. Once a social streaming service is added, the login information (e.g., user name and password) are optionally stored as part of the active user profile allowing the user to automatically connect to the social streaming service without requiring reentry of the login information.

Selecting an online friend from the friend list initiates a conversation with the selected friend. The live social stream from the selected friend appears in the live social streaming component. The programming guide may include more than one live social streaming component allowing more than one conversation to occur at one time. If the set-top box user appears online but the set-top box is not tuned to the social streaming channel and the set-top box includes more than one tuner, some embodiments offer the set-top box user the option of displaying both the content of the currently tuned television channel and the live social stream. Either content stream may be selected as the primary display with the other content stream appearing in a picture in picture (PIP) window. Where the participants in a conversation are both set-top box users, the use of a PIP window for displaying the television content stream or the live social stream contributes to a shared television content viewing experience.

In various embodiments, selecting a friend from the friend list offers an option to display the profile of the selected friend retrieved from the social streaming service with which the selected friend is associated. In various embodiments, information from a set-top box user's profile associated with the subscriber account is provided to friends. The information in the set-top box user's profile may also include information collected and/or aggregated by the cable provider through the programming guide. In some embodiments, the set-top box user profile information is used to provide recommendations based on the set-top box user's current activity.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Further features, aspects, and advantages of the invention represented by the embodiments described within the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

A cable television system with integrated social streaming is described herein and illustrated in the accompanying figures. The cable television system with integrated social streaming includes a set-top box in communication with a camera and/or a microphone that allows video and/or audio communication over a social streaming channel offered by the cable provider. The cable television system with integrated social streaming provides an interactive experience for a set-top box user by allowing the user to participate in video and/or audio conversations with friends on supported social streaming services.

Figure 1:
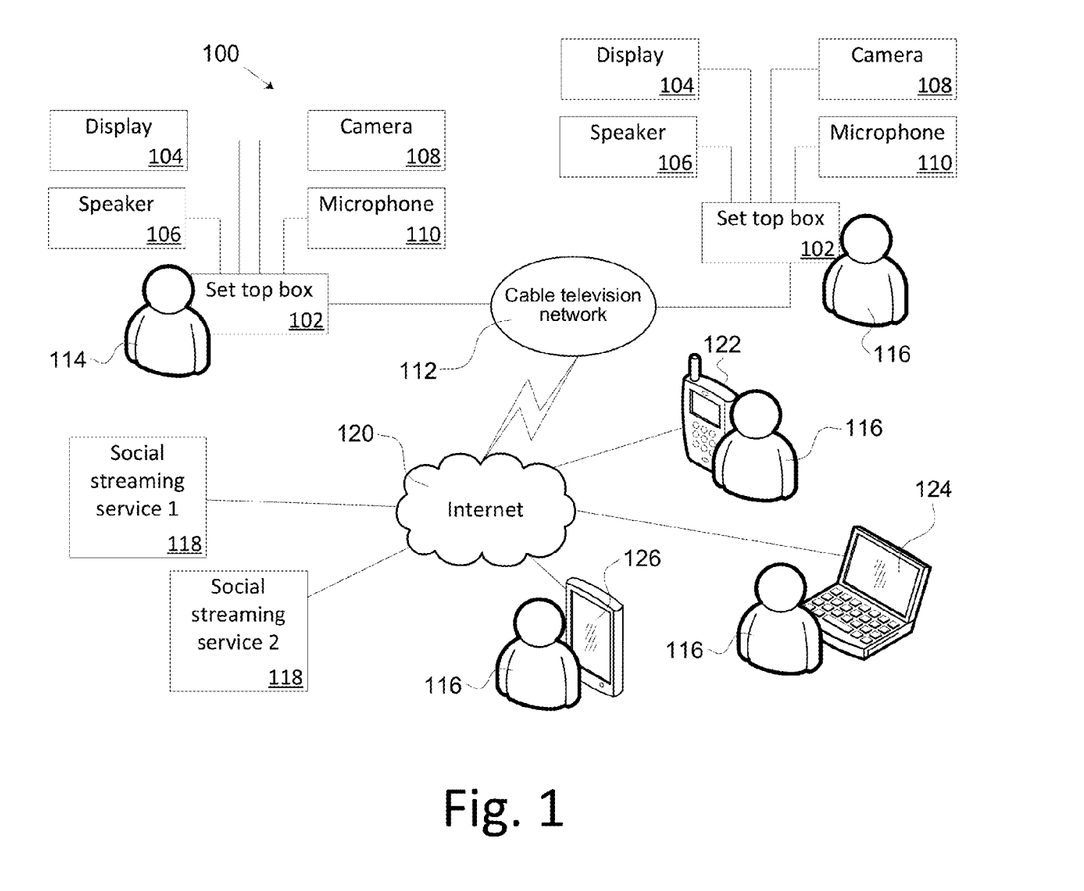
FIG. 1 is a simplified block diagram of one embodiment of the cable system with integrated social streaming.

FIG. 1 is a block diagram of one embodiment of the cable television system with integrated social streaming 100. The social streaming cable television system 100 includes a set-top box 102, a display 104, a speaker 106, a camera 108, and a microphone 110 at the physical location associated with a cable system subscriber account. In various embodiments, the display and speaker are part of a television set. The subscriber creates one or more user profiles corresponding to individuals associated with the subscriber account. The set-top box 102 is connected to the cable television network 112 and serves as the client that allows the set-top box user (i.e., viewer) 114 to participate in conversations with friends 116 on supported social streaming services 118 such as that provided by ustream.tv. The cable television network 112 is connected to the internet 120 to make connections with the supported social streaming services 118. Friends 116 are not limited to using the set-top box 102 as a client and may participate in a conversation using any number of various hardware devices as clients including, but not limited to, phones/smart phones/camera phones 122, computers 124, and tablets 126. The social streaming services are integrated through the cable television network so the set-top box user is not required to have a separate internet account.

The camera and microphone are in communication with the set-top box allowing the set-top box to capture local audio and video. In one embodiment, the camera and microphone are integrated into the television set in communication with the set-top box. In another embodiment, the camera and microphone are in an external module in communication with the set-top box. In yet another embodiment, the camera and microphone are integrated into the set-top box.

Figure 2:
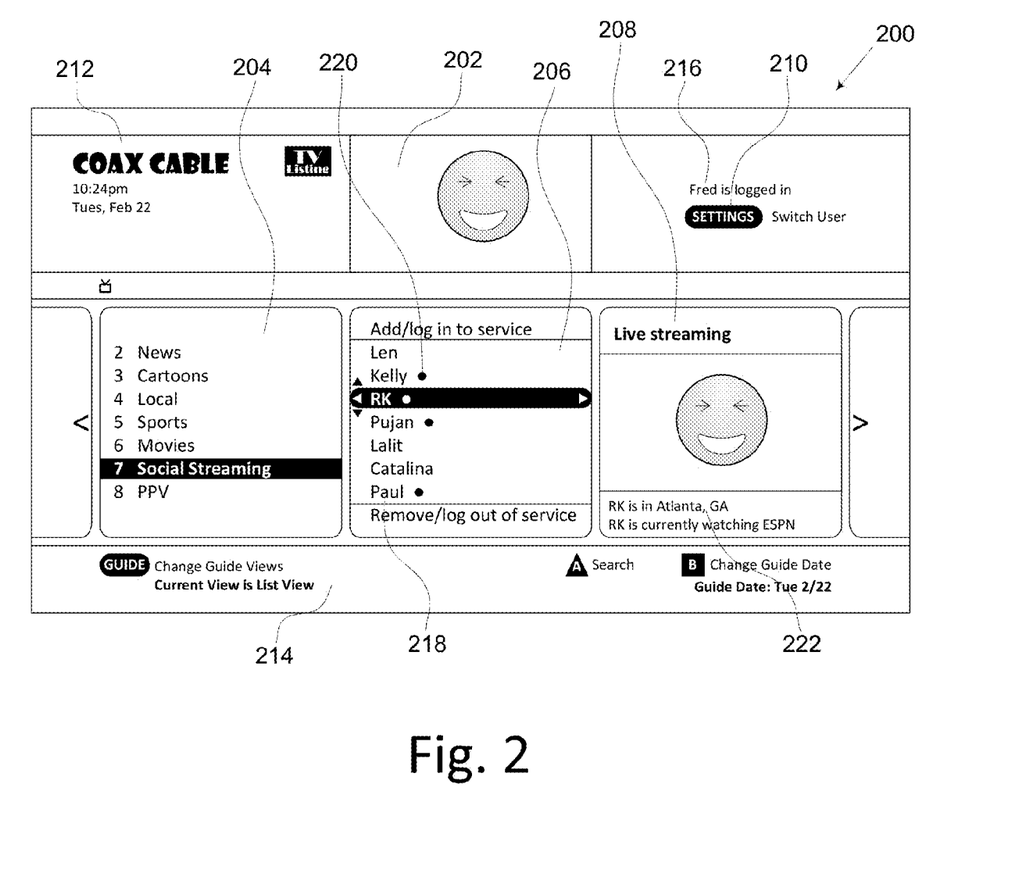
FIG. 2 is an illustration of one embodiment of a user interface for the integrated social streaming service provided by the programming guide of the set-top box.
Figure 3:
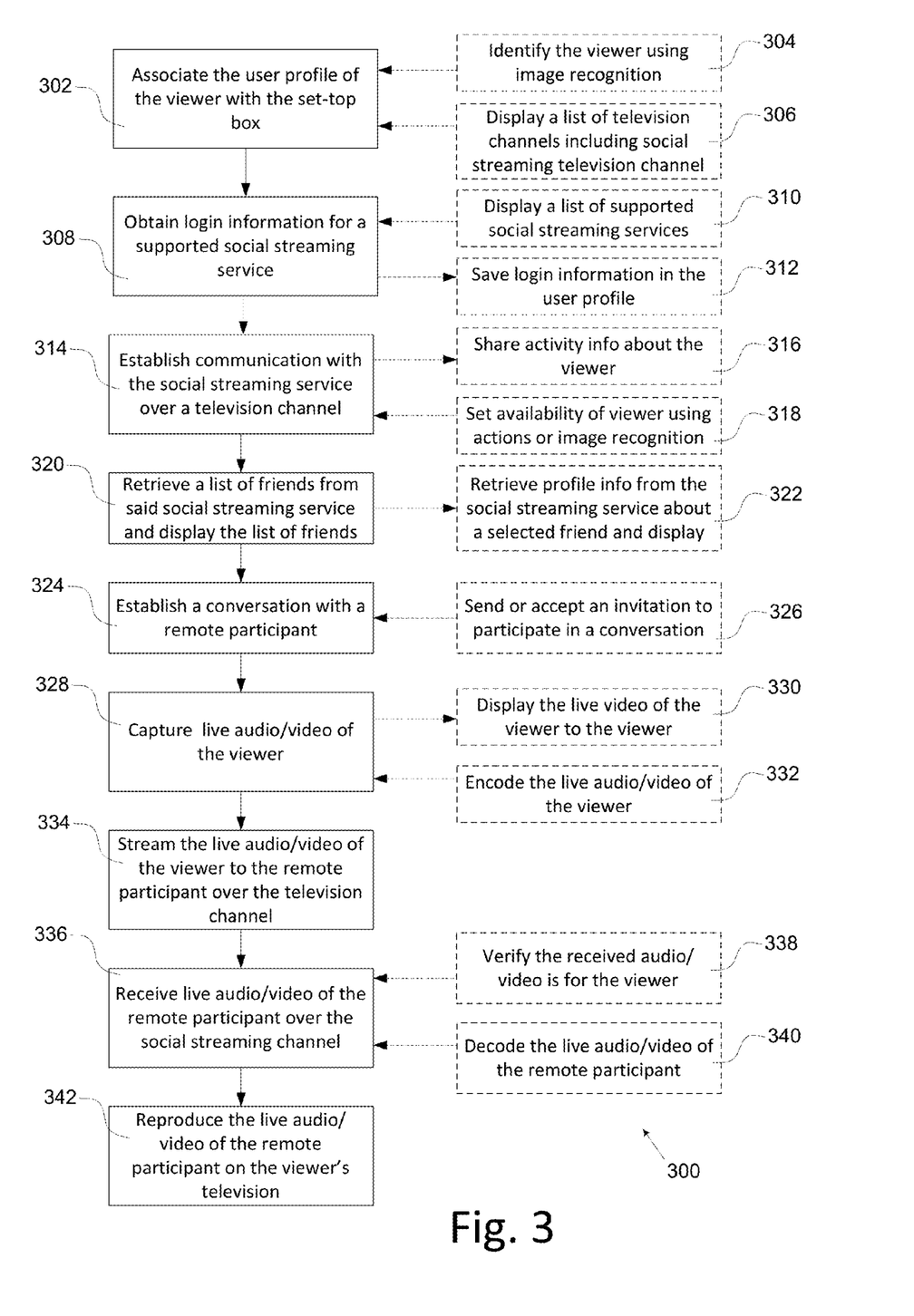
FIG. 3 is a flowchart of one embodiment of the method performed by the social streaming application.

FIG. 2 is an illustration of one embodiment of the front end of the social streaming application 200 provided by the programming guide of the set-top box. FIG. 3 is a flowchart of one embodiment of the method 300 performed by the social streaming application 200 described in relation to the pictorial representation of one embodiment of a user interface for the social streaming application 200. Subprocesses and/or optional operations of the method 300 are illustrated in broken lines.

The social streaming application 200 includes a local display component 202, a television channel selection component 204, a social network interface component 206, at least one live social streaming component 208, and a profile management component 210. In the illustrated embodiment, the social streaming front end also includes optional components such as a logo and/or advertising component 212 and an options and settings component 214. The back end of the social streaming application handles connections to supported social streaming services, captures local audio and video using the camera and microphone 328, encodes and addresses the captured audio and video 332, and streams the encoded audio and video on the social streaming channel 334, receives incoming audio and video on the social streaming channel 336, determines if incoming audio and video is addressed to the active user profile 338, decodes incoming audio and video addressed to the active user profile 340, and sends the decoded audio and video to the front end for output 342.

Initially, the set-top box user logs in 302 to the social streaming application 200 using a user profile 216 associated with a subscriber account. The user profile 216 uniquely identifies the set-top box user and allows the retrieval of customized settings such as favorite channels and, in this case, social streaming service login information. In various embodiments, logging into the social streaming application is accomplished through the profile management component 210.

In some embodiments, the social streaming application uses image recognition to automate setting the active set-top box user profile to that of the user present in the camera's field of view 304. For example, the social streaming application may be trained by associating one or more user specific recognition patterns (e.g., images of the user's face) with a particular user profile. When the social streaming application is executed, a user recognition technique (e.g., facial recognition) is used to attempt to identify the user. If a matching pattern is found, the social streaming application automatically makes the user profile associated with the matching pattern the active user profile.

The television channel selection component 204 displays a list of channels offered by the provider of the cable television network 306. The cable television network 112 includes at least one channel dedicated to social streaming. In various embodiments, the list of channels is customizable based on the selected user profile. The selected television channel is highlighted in the television channel selection component. In the illustrated embodiment, the social streaming channel is selected.

The social network interface component 206 allows the currently active user profile to be associated with any supported social streaming service(s) 118 and provides information about and/or from any social streaming services associated with the currently active user profile. In the illustrated embodiment, the social network interface component includes an option to add and/or log in to a social streaming service and an option to remove and/or log out of a social streaming service. Once the user adds or logs into a social streaming service, the social network interface component displays fields used to log in to the selected social streaming service allowing the social streaming application to obtain the login information for the social streaming service 308. In one embodiment, when a user selects the option to add or log in to a social streaming service, the social network interface component displays a list of supported social streaming services 310. Examples of the fields used to log in to the selected social streaming service include, but are not limited to, a user name field and a password field. In various embodiments, the front end displays an on-screen keyboard for entering characters into the fields. At the conclusion of the adding a social streaming service action, the social network interface component returns to the friend list display. Once a social streaming service is added, the login information (e.g., user name and password) are optionally saved as part of the active user profile allowing the user to automatically connect to the social streaming service without requiring reentry of the login information 312.

The option to log out of a social streaming service disconnects an active connection to a selected social streaming service without removing the login information from the active user profile. When the log out action is selected, the social network interface component displays a list of the currently connected social streaming services. Once the user selects a social streaming service, the connection to the selected social streaming service is terminated and the social network interface component returns to the friend list display.

The option to remove a social streaming service permanently disconnects any active connection to a selected social streaming service and permanently removes the login information from the active user profile. When the remove action is selected, the social network interface component displays a list of the social streaming services currently associated with the active user profile. Once the user selects a social streaming service, any active connection to the selected social streaming service is terminated and the login information for the selected social streaming service is removed from the active user profile. At the conclusion of adding a social streaming service action, the social network interface component returns to the friend list display.

The social streaming application 200 handles the necessary authentication to connect to the selected social streaming service using the supplied login information over the social streaming channel 314. Once the currently active user profile 216 is connected to a social streaming service 118 via the social streaming channel, the social streaming application 200 retrieves and displays a list of the user's friends 320. The user names of friends and other information about the social streaming service or the friends is retrieved from each social streaming service 118. The list 218 is displayed in the social network interface component 206. In some embodiments, the social network interface component uses indicia to identify the social streaming services to which the friend belongs. For example, the list of friends may be color coded by social streaming service or may display icons representing the social streaming service next to each name.

The friend list also shows a status indicator 220 next to each friend name to indicate the friend's status. At a minimum, the status indicator 220 shows whether the friend is online (i.e., connectivity). In some embodiments, the status indicator 220 shows the activity of the friend. Examples of the activities shown include, but are not limited to, whether the friend is active, idle, away, or busy (e.g., watching a television channel). In some embodiments, the status indicator 220 shows the social streaming capabilities of the friend's device. For example, the status indicator may show whether the device used by the friend supports both video and audio or audio only. In various embodiments, the status identifier uses two or more indicia to represent connectivity, activity, and capability. Examples of suitable indicia include color coding and different icons. In various embodiments, the status of the user of the set-top box is only shown as available when the set-top box is tuned to the social streaming channel. In other embodiments, the user of the set-top box can choose to be shown as always online even when the set-top box is tuned to a channel other than the social streaming channel.

In some embodiments, the social streaming application monitors activity or motion to automate setting the status of the active set-top box user 318. For example, if there is no activity from the set-top box controls or the remote for a selected amount of time, the status of the active set-top box user is set to an appropriate inactive status, such as "away." When activity from the set-top box controls or the remote occurs, the status of the active set-top box user is restored to an active status, such as "available." In some embodiments, the social streaming application uses image recognition to automate setting the status of the active set-top box user. For example, the social streaming application may employ motion detection algorithms to look for movement in the camera's field of view. For example, the social streaming application may analyze and compare successive images captured by said camera for objects that appear in different locations in successive images to identify motion in the camera's field of view. If there is no motion in the camera's field of view, the status of the active set-top box user is set to an appropriate inactive status, such as "away." In some embodiments, the social streaming application only changes the status to an inactive status if motion is not detected for a selected amount of time. In some embodiments, the facial (or other) recognition is used to determine if the set-top box user is present in the camera's field of view, and, if not present, the set-top box user's status is changed to an inactive status. If the set-top box user's status is an inactive status and motion is detected in the camera's field of view, the social streaming application restores the status to an active status, such as "available." In some embodiments, facial (or other) recognition must identify the presence of the set-top box user before the status is restored to an active status. In some embodiments, a filter is applied to a moving object to avoid false triggers. For example, the filter may prevent the camera from restoring the status to an active status due to movement of an animal. In some embodiments, the filter is size (e.g., height), shape (e.g., two-legged or four-legged), or mass (e.g., weight or space occupied) based.

The social streaming application 200 allows the set-top box user to participate in a live conversation including audio and/or video with a remote participant 324. Specifically, the social streaming application 200 allows the set-top box user to invite a friend to a conversation or be invited to a conversation by a friend 326. Selecting an online friend from the friend list initiates a conversation with the selected friend. The device and/or social streaming service being used by the friend dictate how the invitation is accepted. In one embodiment, the conversation is initiated by sending an invitation to the friend. Accepting the invitation is similar to answering a phone call. The live social stream from the selected friend appears in the live social streaming component. In various embodiments, the live social streaming component is resizable from the default size to full screen and various sizes in between including, but not limited to, one quarter, one third, or one half of the screen.

As previously mentioned, the programming guide may include more than one live social streaming component allowing more than one conversation to occur at one time. Each live social streaming component displays the live social stream from one selected friend. In various embodiments, all selected friends are joined in a party where the audio streams are merged and shared between all selected friends. The set-top box user may also view live video feeds from all selected friends.

When a friend initiates a conversation with the set-top box user, the manner in which the invitation is handled depends upon the state of the set-top box. In various embodiments, the friend's live stream is automatically displayed in the live streaming component when the set-top box is tuned to the social streaming channel. In some embodiments, the set-top box user receives an invitation and must accept the invitation before the video and/or audio captured by the camera and/or microphone is sent back to the friend initiating the conversation.

The local display component 202 shows the video captured by the attached camera and allows the set-top box user to monitor what friends are seeing 330. For example, this allows the set-top box user to ensure that his/her image is properly framed or adequately lit. In some embodiments, the local display component 202 may alternatively display the programming from the last television channel.

If the set-top box user appears online but the set-top box is not tuned to the social streaming channel, the programming guide handles an invitation from a friend in various ways. In some embodiments, the set-top box displays a notification alerting the set-top box user to return to the social streaming channel to join a conversation. If the set-top box includes more than one tuner, some embodiments offer the set-top box user the option of displaying both the content of the currently tuned television channel and the live social stream. Either content stream may be selected as the primary display with the other content stream appearing in a picture in picture (PIP) window. For example, the PIP window may initially display the live social stream and the set-top box user may choose to swap the locations of the content streams so the live social stream appears in the primary window and the television channel appears in the PIP window. Where the participants in a conversation are both set-top box users, the use of a PIP window for displaying the television content stream or the live social stream contributes to a shared television content viewing experience.

If the profile management component 210 is selected (e.g., the "switch users" control is selected), the social streaming settings including, but not limited to, the login information provided for any supported social streaming service is saved for the active user profile before another user profile is activated. In some embodiments, the look and feel (e.g., the size of the live streaming component) of the social streaming application is also saved for the active profile. In some embodiments, the options to add or remove social streaming services and/or to log in or out of a social streaming service are accessed through the settings control of the profile management component 210 rather than being included in the social network interface component 206.

In various embodiments, selecting a friend from the friend list offers an option to display the profile of the selected friend retrieved from the social streaming service with which the selected friend is associated 322. In some embodiments, the profile 222 is displayed in the social network interface component 206. When the set-top box user finishes viewing the profile, the friend list is restored to the social network interface component. In other embodiments, the profile is displayed in the live social streaming component 208. If the live social streaming component is showing a live social stream, the profile temporarily replaces the live video stream but the live audio stream continues. When the set-top box user finishes viewing the profile, the live video stream is restored. In some embodiments, the profile information or some portion of the profile information is displayed around (e.g., above or below) the live video stream in the live social streaming component 208 without replacing the live social stream as shown in the illustrated embodiment.

In various embodiments, information from a set-top box user's profile associated with the subscriber account is provided to friends 316. In some embodiments, the information in the set-top box user's profile includes information provided by the set-top box user. The information in the set-top box user's profile may also include information collected and/or aggregated by the cable provider through the programming guide. In some embodiments, the set-top box user's profile may indicate the television channel to which the set-top box is currently tuned or the show the set-top box user is currently watching. In some embodiments, the set-top box user's profile may indicate the television channel or show that the set-top box user has predominately watched during some period of time (e.g., all time or a selected recent time period).

In some embodiments, the set-top box user profile information is used to provide recommendations based on the set-top box user's current activity. For example, where the participants in a conversation are both set-top box users using set-top boxes with multiple tuners, the program guide may suggest that one user tune to the television channel being watched by the other user to participate in a shared television viewing experience. In some embodiments, the programming guide will automatically handle tuning in to the suggested television channel on a second tuner if the suggestion is accepted.

In various embodiments, the set-top box user profile provides addressing for the live social streams in which the set-top box user is participating. This allows different set-top box users to participate in separate conversations from different set-top boxes assigned to one subscriber. In some embodiments, the set-top box user profile is linked to the identifier of the set-top box where the set-top box user's profile is active. In other embodiments, an identifier associated with the set-top box user is embedded into the live social streams in which the set-top box user is participating and the social streaming application only decodes live social streams containing an identifier matching the active user profile.

Figure 4:
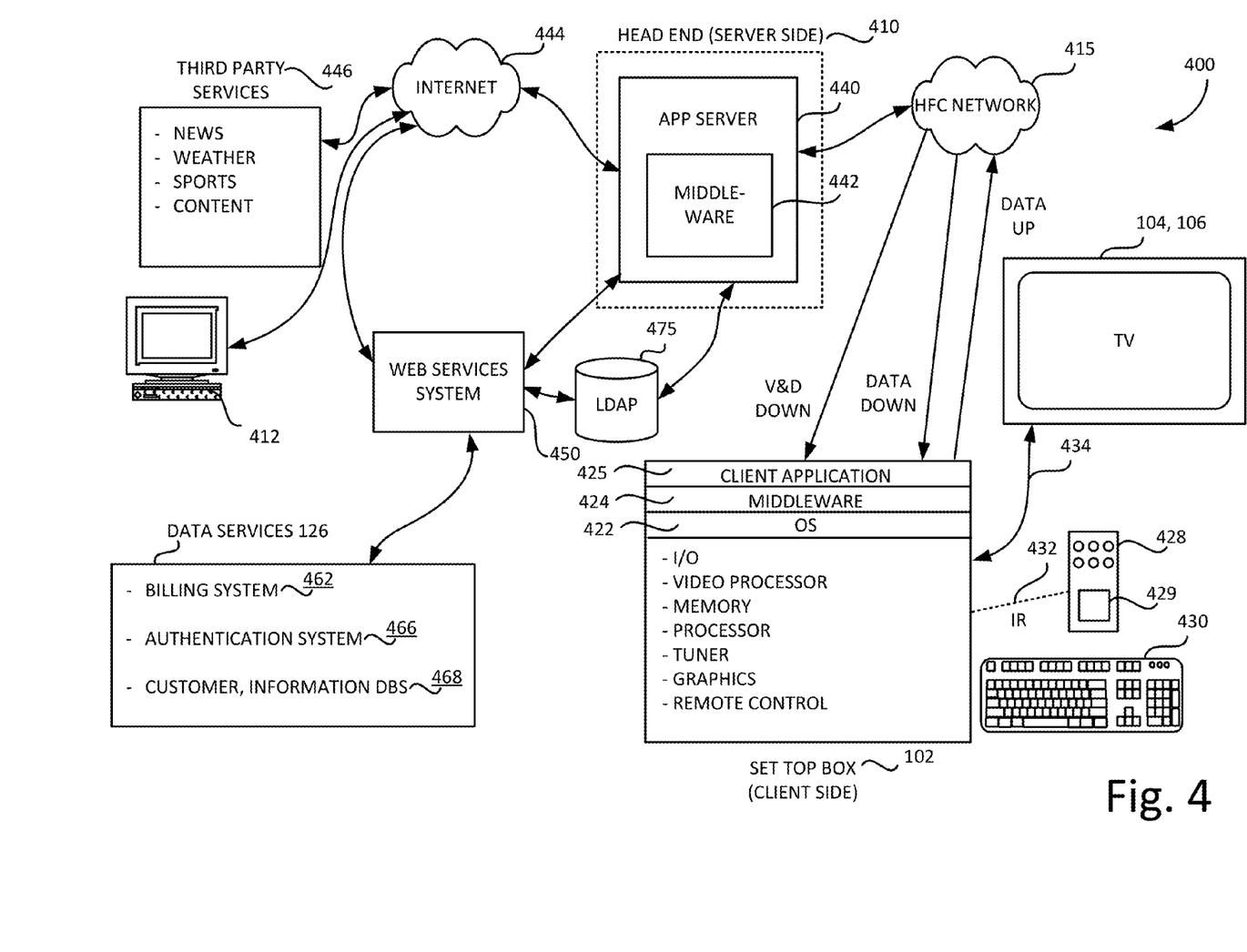
FIG. 4 is a simplified block diagram illustrating a cable television services system architecture providing an operating environment according to an embodiment.

FIG. 4 is a simplified block diagram illustrating a cable television services system 400 (hereafter referred to as "CATV") architecture providing an operating environment according to an embodiment. As should be appreciated, a CATV services system 400 is but one of various types of systems that may be utilized for providing an operating environment for providing social streaming. Referring now to FIG. 4, digital and analog video programming, information content and interactive television services are provided via a hybrid fiber coax (HFC) network 415 to a television set for consumption by a cable television/services system customer. As is known to those skilled in the art, HFC networks 415 combine both optical fiber and coaxial cable lines. Typically, optical fiber runs from the cable head end 410 to neighborhoods of subscribers. Coaxial cable runs from the optical fiber feeders to each customer or subscriber. The functionality of the HFC network 415 allows for efficient bidirectional data flow between the client-side set-top box 102 and the server-side application server 440 of the embodiment.

The CATV system 400 is in the form of a distributed client-server computing system for providing video and data flow across the HFC network 415 between server-side services providers (e.g., cable television/services providers) via a server-side head end 410 and a client-side customer via a client-side set-top box 102 functionally connected to a customer receiving device, such as the television set. As is understood by those skilled in the art, modern CATV systems 400 may provide a variety of services across the HFC network 415 including traditional digital and analog video programming, telephone services, high speed Internet access, video-on-demand, and information services.

On the client side of the CATV system 400, digital and analog video programming and digital and analog data are provided to the customer television set via the set-top box 102. Interactive television services that allow a customer to input data to the CATV system 400 likewise are provided by the set-top box 102. As illustrated in FIG. 4, the set-top box 102 is a multipurpose computing device having a computer processor, memory, and an input/output mechanism. The input/output mechanism receives input from server-side processes via the HFC network 415 and from customers via input devices such as the remote control device 428, keyboard 430, or other computing device 412, such as a smart phone 122, a personal computer (e.g., a laptop or desktop) 124, a tablet/slate computer 126, etc. The remote control device 428 and the keyboard 430 may communicate with the set-top box 102 via a suitable communication transport such as the infrared connection 432. The remote control device 428 may include a biometric input module 429. The set-top box 102 also includes a video processor for processing and providing digital and analog video signaling to the television set via a cable communication transport 434. A multi-channel tuner is provided for processing video and data to and from the set-top box 102 and the server-side head end system 410, described below.

The set-top box 102 also includes an operating system 422 for directing the functions of the set-top box 102 in conjunction with a variety of client applications 425. For example, if a client application 425 requires a news flash from a third-party news source to be displayed on the television, the operating system 422 may cause the graphics functionality and video processor of the set-top box 102, for example, to output the news flash to the television at the direction of the client application 425 responsible for displaying news items.

Because a variety of different operating systems 422 may be utilized by a variety of different brands and types of set-top boxes, a middleware layer 424 may be provided to allow a given software application to be executed by a variety of different operating systems. According to an embodiment, the middleware layer 424 may include a set of application programming interfaces (APIs) that are exposed to client applications 425 and operating systems 422 that allow the client applications to communicate with the operating systems through common data calls understood via the API set. As described below, a corresponding middleware layer is included on the server side of the CATV system 400 for facilitating communication between the server-side application server and the client-side set-top box 102. The middleware layer 442 of the server-side application server and the middleware layer 424 of the client-side set-top box 102 may format data passed between the client side and server side according to the Extensible Markup Language (XML).

According to one embodiment, the set-top box 102 passes digital and analog video and data signaling to the television via a one-way communication transport 434. According to other embodiments, two-way communication transports may be utilized, for example, via high definition multimedia (HDMI) ports. The set-top box 102 may receive video and data from the server side of the CATV system 400 via the HFC network 415 through a video/data downlink and data via a data downlink. The set-top box 102 may transmit data from the client side of the CATV system 400 to the server side of the CATV system 400 via the HFC network 415 via one data uplink. The video/data downlink is an "in band" downlink that allows for digital and analog video and data signaling from the server side of the CATV system 400 through the HFC network 415 to the set-top box 102 for use by the set-top box 102 and for distribution to the television set. As is understood by those skilled in the art, the "in band" signaling space operates at a relative high frequency, e.g., between 54 and 1000 megahertz. The signaling space is generally divided into channels which may be transmitted as a single analog signal or a greater number (e.g., ten) of digital signals.

The data downlink and the data uplink, illustrated in FIG. 4, between the HFC network 415 and the set-top box 102 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 102 and the server-side application server 440 is typically passed through the "out of band" data links. Alternatively, an "in band" data carousel may be positioned in an "in band" channel into which a data feed may be processed from the server-side application server 440 through the HFC network 415 to the client-side set-top box 102. Operation of data transport between components of the CATV system 400, described with reference to FIG. 4, is well known to those skilled in the art.

Referring still to FIG. 4, the head end 410 of the CATV system 400 is positioned on the server side of the CATV system and includes hardware and software systems responsible for originating and managing content for distributing through the HFC network 415 to client-side set-top boxes 102 for presentation to customers via televisions. As described above, a number of services may be provided by the CATV system 400, including digital and analog video programming, interactive television services, telephone services, video-on-demand services, targeted advertising, and provision of information content.

The application server 440 is a general-purpose computing system operative to assemble and manage data sent to and received from the client-side set-top box 102 via the HFC network 415. As described above with reference to the set-top box 102, the application server 440 includes a middleware layer 442 for processing and preparing data from the head end of the CATV system 400 for receipt and use by the client-side set-top box 102. For example, the application server 440 via the middleware layer 442 may obtain data from third-party services 446 via the Internet 444 for transmitting to a customer through the HFC network 415 and the set-top box 102. For example, content metadata a third-party content provider service may be downloaded by the application server via the Internet 444. When the application server 440 receives the downloaded content metadata, the middleware layer 442 may be utilized to format the content metadata for receipt and use by the set-top box 102. Therefore, content metadata may be sent and categorized based on the availability to the customer's program guide data.

According to one embodiment, data obtained and managed by the middleware layer 442 of the application server 440 is formatted according to the Extensible Markup Language and is passed to the set-top box 102 through the HFC network 415 where the XML-formatted data may be utilized by a client application 425 in concert with the middleware layer 424, as described above. As should be appreciated by those skilled in the art, a variety of third-party services data, including news data, weather data, sports data and other information content may be obtained by the application server 440 via distributed computing environments such as the Internet 444 for provision to customers via the HFC network 415 and the set-top box 102. According to embodiments, client application 425 may include the social streaming application 200 described herein.

According to embodiments, the application server 440 obtains customer support services data, including billing data, information on customer work order status, answers to frequently asked questions, services provider contact information, and the like from data services for provision to the customer via an interactive television session. As illustrated in FIG. 4, the services provider data services include a number of services operated by the services provider of the CATV system 400 which may include data on a given customer.

A billing system 462 may include information such as a customer's name, street address, business identification number, Social Security number, credit history, and information regarding services and products subscribed to by the customer. According to embodiments, the billing system 462 may also include billing data for services and products subscribed to by the customer for bill processing, billing presentment and payment receipt.

A customer information database 468 may include general information about customers such as place of employment, business address, business telephone number, and demographic information such as age, gender, educational level, and the like. The customer information database 468 may also include information on pending work orders for services or products ordered by the customer. The customer information database 468 may also include general customer information such as answers to frequently asked customer questions and contact information for various service provider offices/departments. As should be understood, this information may be stored in a variety of disparate databases operated by the cable services provider.

Referring still to FIG. 4, web services system 450 is illustrated between the application server 440 and the data services. According to embodiments, web services system 450 serves as a collection point for data requested from each of the disparate data services systems comprising the data services. According to embodiments, when the application server 440 requires customer services data from one or more of the data services, the application server 440 passes a data query to the web services system 450. The web services system formulates a data query to each of the available data services systems for obtaining any required data for a requesting customer as identified by a set-top box identification associated with the customer. The web services system 450 serves as an abstraction layer between the various data services systems and the application server 440. That is, the application server 440 is not required to communicate with the disparate data services systems, nor is the application server 440 required to understand the data structures or data types utilized by the disparate data services systems. The web services system 450 is operative to communicate with each of the disparate data services systems for obtaining necessary customer data. The customer data obtained by the web services system is assembled and is returned to the application server 440 for ultimate processing via the middleware layer 442, as described above.

An authentication system 466 may include information such as secure user names, subscriber profiles, subscriber IDs, and passwords utilized by customers for access to network services. As should be understood by those skilled in the art, the disparate systems 450, 462, 466, 468 may be integrated or provided in any combination of separate systems, wherein FIG. 4 shows only one example.

Figure 5:
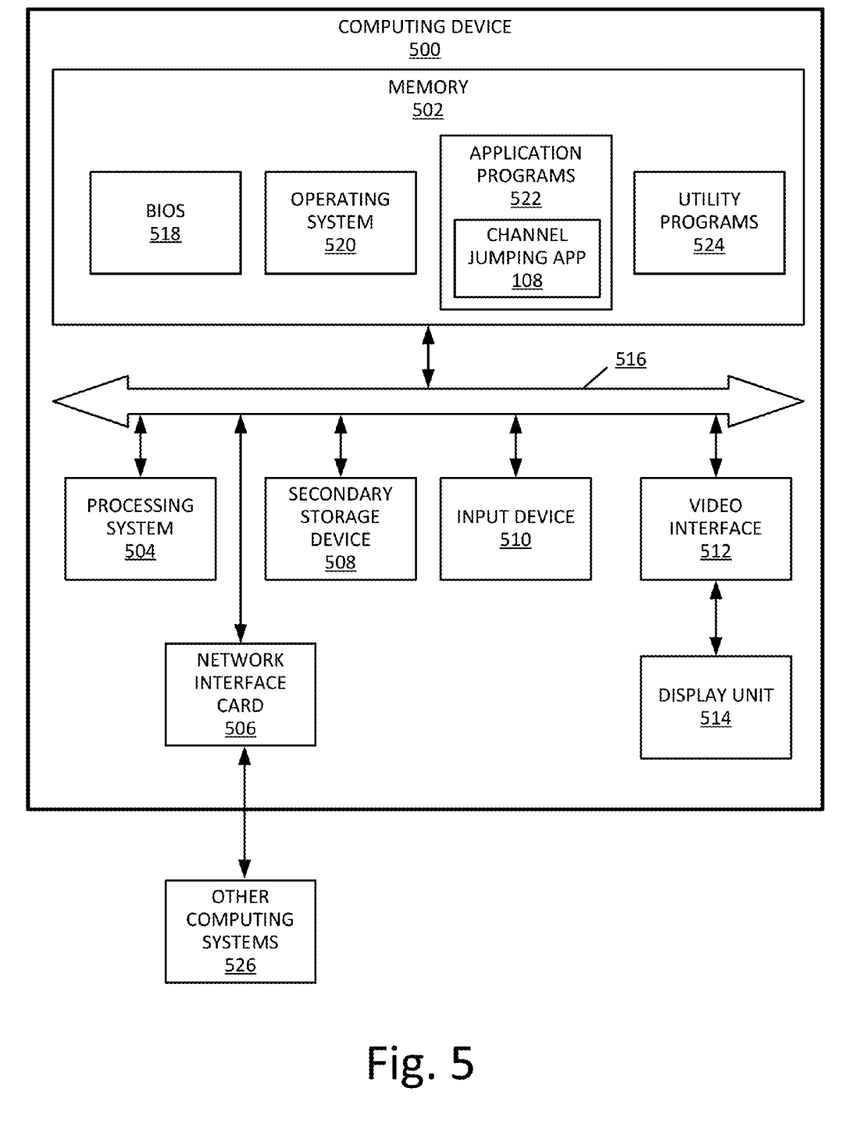
FIG. 5 is a simplified block diagram illustrating example physical components of a computing device with which embodiments may be practiced.

FIG. 5 is a simplified block diagram illustrating example physical components of a computing device 500 with which embodiments may be practiced. In some embodiments, one or a combination of the components of system 100 may be implemented using one or more computing devices like the computing device 500. It should be appreciated that in other embodiments, components of system 100 may be implemented using computing devices having hardware components other than those illustrated in the example of FIG. 5.

Computing devices may be implemented in different ways in different embodiments. For instance, in the example of FIG. 5, the computing device 500 includes a processing system 504, memory 502, a network interface 506, a secondary storage device 508, an input device 510, a video interface 512, a display unit 514, and a communication medium 516. In other embodiments, the computing device 500 may be implemented using more or fewer hardware components (e.g., a video interface, a display unit, or an input device) or in combination with other types of computer systems and program modules 526.

The memory 502 includes one or more computer-readable storage media capable of storing data and/or computer-executable instructions. According to one embodiment, the social streaming application 200 may be stored locally on computing device 500. Memory 502 thus may store the computer-executable instructions that, when executed by processor 504, cause the social streaming application 200 to allow a set-top box user to participate in audio/video and/or audio conversations with friends on supported social streaming services as described above with reference to FIGS. 1-2.

In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more Intel Core microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users, for example, the social streaming application 200. The memory 502 also stores one or more utility programs 524 that, when executed by the processing system 504, cause the computing device 500 to provide utilities to other software programs.

Embodiments of the present invention may be utilized in various distributed computing environments where tasks are performed by remote processing devices that are linked through a communications network in a distributed computing environment.

Figure 6A:
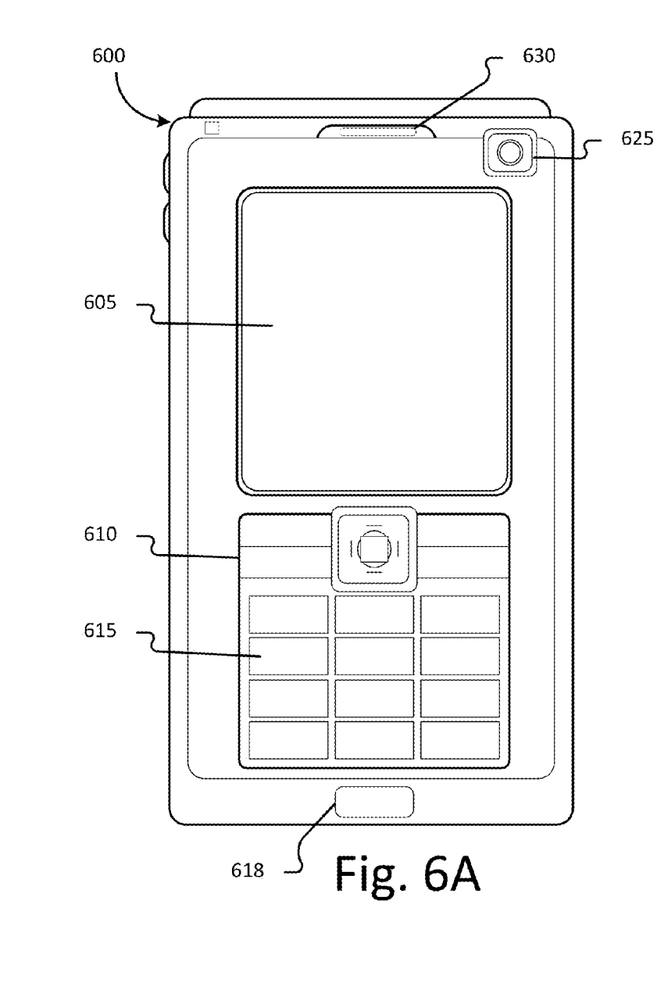
FIGS. 6A and 6B illustrate a suitable mobile computing environment with which embodiments may be practiced.
Figure 6B:
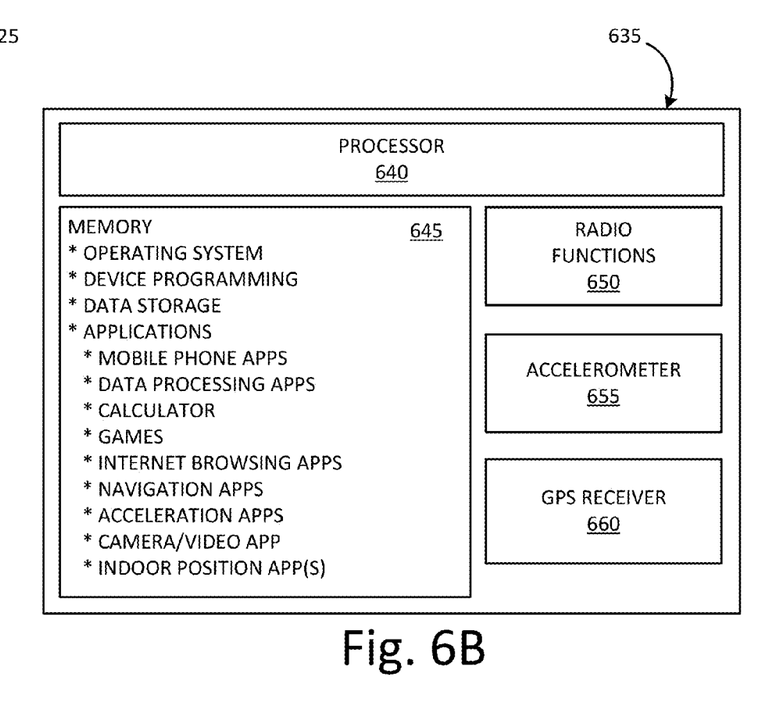

FIGS. 6A and 6B illustrate a suitable mobile computing environment, for example, a mobile computing device, a smart phone 122, a tablet personal computer 126, a laptop computer 124, and the like, with which embodiments may be practiced. The mobile computing device 600 is illustrative of any suitable device operative to send, receive, and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the device 600 may be performed via a variety of suitable means, such as, touch screen input via the display screen 605, keyboard or keypad input via a data entry area 610, key input via one or more selectable buttons or controls 615, voice input via a microphone 618 disposed on the device 600, photographic input via a camera 625 functionality associated with the mobile computing device, or any other suitable input means. Data may be output via the device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the social streaming application 200 may be stored locally on mobile computing device 600.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the device 600 to communicate with other communication devices and systems via a wireless network. Radio functions 650 may be utilized to communicate with a wireless or a WI-FI positioning system to determine the location of a device 600.

Although described herein in combination with mobile computing device 600, in alternative embodiments the invention may be used in combination with any number of computer systems, such as in desktop environments, laptop or notebook computer systems, multiprocessor systems, microprocessor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to flowcharts and/or operational illustrations of methods, systems, and computer program products according to embodiments. The functions/acts noted in the blocks may occur out of the order as shown in any flowchart or described herein with reference to the Figures. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A cable television system with integrated social streaming allowing a viewer to participate in a conversation with a remote participant, said cable television system with integrated social streaming comprising:
   a set-top box in communication with a cable television network having a social streaming television channel for displaying live social streams, said set-top box including at least one television tuner tunable to said social streaming television channel, wherein said set-top box is associated with a subscriber account;
   a camera for capturing images of the viewer, said camera in communication with said set-top box;
   a microphone for capturing sounds of said viewer, said microphone in communication with said set-top box;
   a display for displaying images of the remote participant to said viewer, said display in communication with said set-top box;
   a speaker in communication with said display for playing sounds for said viewer, said speaker in communication with said set-top box;
   said set-top box executing a social streaming application operable to:
      log the viewer into the social streaming application using a user profile for the cable television system that is associated with the viewer, wherein said user profile is associated with said subscriber account, wherein the social streaming application is operable to log in the viewer to the user profile by using image recognition to identify the viewer in a field of view of the camera;
      establish communication with a social streaming service over said social streaming television channel;
      identify user conversations associated with said viewer from a plurality of conversations associated with a plurality of users, wherein each user of said plurality of users has a corresponding user profile associated with said subscriber account;
      retrieve a list of friends from said social streaming service;
      display said list of friends on said display;
      establish a conversation with the remote participant from said list of friends;

recommend utilizing a second tuner to view a television channel being watched by the remote participant to participate in a shared viewing experience;

capture live sounds from said viewer using said microphone;

capture live images of said viewer using said camera;

stream said live sounds and said live images to said remote participant;

receive a live stream of sounds from and images of said remote participant; and reproduce said live stream of sounds and images for said viewer using said display and said speaker.

2. The cable television system with integrated social streaming of claim 1 wherein said social streaming application is further operable to encode said live sounds from and said live images of said viewer into a content stream.

3. The cable television system with integrated social streaming of claim 1 wherein said social streaming application is further operable to decode said live stream of sounds from and images of said remote participant.

4. The cable television system with integrated social streaming of claim 1 wherein said social streaming application is further operable to provide a notification of an incoming conversation request when said viewer has tuned said set-top box to a channel other than said social streaming television channel.

5. The cable television system with integrated social streaming of claim 1 wherein said social streaming application is further operable to:
   accept a selection of said remote participant from said list of friends; and
   send an invitation to participate in a live conversation to said remote participant through said social streaming television channel.

6. The cable television system with integrated social streaming of claim 1 wherein said social streaming application is further operable to prevent streaming of said live sounds and said live images to said remote participant if said viewer elects not to participate in a live conversation.

7. The cable television system with integrated social streaming of claim 1 wherein said at least one television tuner comprises a plurality of television tuners, said social streaming application operable to:
   display said live incoming stream of audio and video using one of said plurality of television tuners tuned to said social streaming television channel; and
   simultaneously display content from the television channel other than said social streaming television channel using another of said plurality of television tuners.

8. The cable television system with integrated social streaming of claim 1 wherein the social streaming application is operable to log the viewer into the social streaming application by using image recognition to set the user profile associated with the viewer by identifying the viewer present in the field of view of the camera.

9. A method of integrating a social streaming service with a cable system television programming guide allowing a viewer of a display and associated speaker in communication with a microphone and a camera to engage in a conversation with a remote participant over a channel of a cable television network, said method comprising the acts of:
   logging the viewer into the social streaming service using a user profile associated with a subscriber account for a cable television system that is associated with the viewer, wherein a social streaming service is operable to log in the viewer to the user profile by using image recognition to identify the viewer in a field of view of the camera;
   providing a social streaming channel using a first tuner over the cable television network;
   connecting the viewer to said social streaming service over said social streaming channel;
   identifying user conversations associated with said viewer from a plurality of conversations associated with a plurality of viewers associated with a corresponding plurality of user profiles, wherein the corresponding user profiles are also associated with the subscriber account;
   receiving a list of friends for said viewer from said social streaming service;
   displaying said list of friends on said display;
   establishing communication with the remote participant from said list of friends;
   recommending utilization of a second tuner to view a television channel being watched by the remote participant to participate in a shared viewing experience;
   capturing live audio from said viewer using said microphone;
   capturing live video of said viewer using said camera;
   streaming said live audio and said live video to said remote participant; and
   reproducing a live incoming stream of audio and video received from the remote participant using said display and said speaker.

10. The method of claim 9 further comprising the acts of:
    displaying an invitation to participate in a live conversation with said remote participant; and
    requiring acceptance of said invitation before streaming said live audio and said live video to said remote participant.

11. The method of claim 9 further comprising the acts of:
    accepting an instruction to obtain information about a selected said remote participant from said viewer;
    receiving information about said selected remote participant from said social streaming service;
    displaying said information about said remote participant on said display.

12. The method of claim 9 further comprising the acts of:
    collecting activity information about the television channel watched by said viewer; and
    sharing said activity information with friends on said list of friends.

13. The method of claim 9 further comprising the act of setting a status for said viewer based on presence or absence of motion in said field of view of the camera.

14. The method of claim 13 wherein said act of setting the status for said viewer based on presence or absence of motion in said field of view of the camera further comprises the acts of:
    setting said status for said viewer to an inactive status when no motion occurs in said field of view of the camera; and
    setting said status for said viewer to the active status when motion occurs in said field of view of the camera.

15. The method of claim 14 wherein said act of setting said status for said viewer to the inactive status when no motion occurs in said field of view of the camera further comprises the act of setting said status for said viewer to the inactive status when no motion occurs in said field of view of the camera for a selected period of time.

16. The method of claim 14 wherein said act of setting said status for said viewer to the active status when motion occurs in said field of view of the camera further comprises the acts of:

applying facial recognition to determine if said viewer is within said field of view of the camera; and setting said status for said viewer to the active status when motion occurs and said viewer is within said field of view of the camera 17. The method of claim 9 wherein a plurality of television tuners are available, said method further comprising the act of displaying said live incoming stream of audio and video in a window while simultaneously displaying content from the television channel other than said social streaming channel.

18. A memory, not including a carrier wave, having computer-executable instructions for providing social streaming over a cable television network, said instructions comprising:

displaying a list of supported social streaming services on a display;

accepting login information for a social streaming service selected from the list of supported social streaming services from a viewer, the login information using a user profile for a cable television system that is associated with a subscriber account and corresponds to the viewer, wherein a social streaming application is operable to log the viewer into the selected social streaming service by using image recognition to set the user profile corresponding to the viewer by identifying the viewer present in a field of view of a camera;

connecting to said selected social streaming service using a first tuner;

identifying user conversations associated with the user profile from a plurality of conversations associated with a plurality of user profiles corresponding to a plurality of viewers associated with the subscriber account; receiving a list of friends from said selected social streaming service;

displaying said list of friends on said display;

establishing communication with a remote participant from said list of friends;

recommending utilization of a second tuner to view a television channel being watched by the remote participant to participate in a shared viewing experience;

capturing live audio from said viewer using a microphone;

capturing live video of said field of view using said camera;

streaming said live audio and said live video to said remote participant; and reproducing a first live incoming stream of audio and video received from the remote participant using a display and a speaker.

19. The memory of claim 18 wherein said instructions further comprise:

establishing communication with a second remote participant from said list of friends; and reproducing a second live incoming stream of audio and video received from said second remote participant using said display and said speaker.

20. The memory of claim 19 wherein said instructions further comprise sharing at least audio from said live audio from said viewer, said first live incoming stream, and second live incoming stream with said viewer, said remote participant, and said second remote participant.

* * * * *